(12) United States Patent  
Inamoto

(10) Patent No.: US 7,035,020 B2  
(45) Date of Patent: Apr. 25, 2006

(54) ZOOM LENS

(75) Inventor: Masayuki Inamoto, Saitama (JP)

(73) Assignee: Fujinon Corporation

( * ) Notice: Subject to any disclaimer, the term of this patent is extended or adjusted under 35 U.S.C. 154(b) by 0 days.

(21) Appl. No.: 11/151,287

(22) Filed: Jun. 14, 2005

(65) Prior Publication Data

US 2005/0286142 A1 Dec. 29, 2005

(30) Foreign Application Priority Data

Jun. 14, 2004 (JP) .............................. 2004-175819

(51) Int. Cl.  
*G02B 15/14* (2006.01)

(52) U.S. Cl. ...................... 359/700; 359/694; 359/699; 359/702

(58) Field of Classification Search ................ 359/694, 359/696–700, 702  
See application file for complete search history.

(56) References Cited

U.S. PATENT DOCUMENTS 5,264,963 A * 11/1993 Ueyama ..................... 359/695

FOREIGN PATENT DOCUMENTS

JP 3498530 12/2003

* cited by examiner

*Primary Examiner*—Loha Ben  
*Assistant Examiner*—Jack Dinh  
(74) *Attorney, Agent, or Firm*—Young & Thompson

(57) ABSTRACT

A zoom lens includes a movable barrel mounting a lens holder barrel having a focusing lens element for rotational and axial movement therein and a cam barrel mounting the movable barrel for rectilinear axial movement therein. The movable barrel is axially moved for zooming through slide engagement between zooming cam slots of the cam barrel and rectilinear axial guide slots of a stationary barrel when the cam barrel rotates and allows the lens holder barrel to axially moves through helicoids coupling. The movable barrel is provided with a moving range restrictive structure having a plurality of screw holes and a single screw pin selectively screwed in one of the screw holes for focus adjustment. The screw pin is exposed to the outside of the zoom lens all at once when the cam barrel is in a telephoto or wide-angle position or one by one during rotation of the can barrel.

4 Claims, 5 Drawing Sheets

ZOOM LENS

BACKGROUND OF THE INVENTION

1. Field of the Invention

The present invention relates to a zoom lens equipped with a focus adjusting mechanism and a zooming cam mechanism for varying a focal length of a zoom lens optical system.

2. Description of Related Art

Various types of zoom lenses are typically equipped with zooming cam mechanisms for moving a lens or lenses through a cam mechanism comprising circumferential cams and rectilinear guide slots. Such a zoom lens equipped with a zooming cam mechanism must have a multiple-barrel structure which comprises a cam barrel having zooming cam slots and a guide barrel having rectilinear guide slots inserted in each other so as to move linearly in an axial direction. A lens element or lens elements forming part of a zoom lens system are mounted in a lens holder barrel provided with cam followers. The lens holder barrel is inserted in the cam barrel or the guide barrel with the cam followers in slide engagement with the zooming cam slots and the rectilinear guide slots so as to move in an axial direction during relative rotation between the lens holder barrel and the cam barrel.

Some types of zoom lenses are equipped with focus adjusting mechanisms for adjusting focus of the zoom lens. Such a focus adjustment mechanism is used to make adjustment of an axial position or a movable range of a focusing lens element in which the zoom lens system is best focused based on resolusion of images at various focal lengths. A focus adjusting mechanism for performing the axial position adjustment of the focusing lens for best focus comprises a focus adjusting ring member having a cam face and a biasing spring for urging the cam face against an end of a lens holder barrel. Resolusion of an image formed by the zoom lens system is examined while rotating the focus adjusting ring member about an axis of the zoom lens system to move the lens holder barrel in an axial direction. The lens holder barrel is fixed in a position in which the zoom lens system forms a best focused image. Alternatively, the adjustment of a movable range of the focusing lens for best focus is performed by selectively bringing a screw pin into engagement with recesses formed in the lens holder barrel for different movable ranges. Another type of focus adjusting mechanism known from, for example, Japanese Patent No. 3498530 includes a spring installed in and biasing the lens holder barrel that is changeable in biasing force so as to adjust a lens position for best focus.

In the prior art zoom lenses in which a focus adjusting mechanisms is installed in a lens holder barrel that is disposed inside the cam barrel, the screw pin for focus adjustment is hidden by the cam barrel when the zoom lens assembled, so that it is impossible to access the screw pin for selecting axial positions or movable ranges of the focusing lens element for best focus from the outside of the zoom lens. Therefore, in order to perform focus adjustment of a zoom lens, it is essential to disassemble the zoom lens.

SUMMARY OF THE INVENTION

It is therefore an object of the present invention to provide a zoom lens which enables easily access to a screw pin for adjusting an axial position or a movable range of a focusing lens element for best focus of the zoom lens from the outside of the zoom lens after the zoom lens has been assembled.

The foregoing object is accomplished by a zoom lens comprising a cam barrel having a plurality of circumferential cam slots for zooming, stationary rectilinear guide means having axial guide slots disposed so that the axial guide slots overlap with the circumferential cam slots, respectively, a movable barrel inserted in the cam barrel so as to be rotatable and linearly movable in an axial direction within the cam barrel, the movable barrel having cam followers in slide engagement with both circumferential cam slots and rectilinear guide slots, respectively, so that the movable barrel is linearly moved in the axial direction with relative rotation between the cam barrel and the movable barrel so as thereby to move at least one lens element forming a part of a zoom lens system for zooming, and focus adjusting means for adjusting focus of the zoom lens system. The focus adjusting means comprises a plurality of focus range selection means formed on the movable barrel for providing different ranges of focus of the zoom lens system, a selection member selectively attachable to the focus range selection means so as to enable either one of the different ranges of focus, and an access slot extending continuously from an extreme end of one or more the circumferential cam slot so as to be brought in line with the focus range selection means for access of the selection member to the focus range selection means from the outside of the cam barrel.

Each of the circumferential cam slots may have the extension slot so that the focus range selection means are brought in line with the extension slots all at once when the cam barrel is put in an extreme end position of a zooming range, namely a telephoto end position or a wide-angle end position Otherwise, at least one of the circumferential cam slots may have the extension slot so that the focus range selection means are brought in line with the extension slot one by one during relative rotation between the movable barrel and the cam barrel. The focus range selection means may be brought in line with the rectilinear guide slot, besides the extension slot The focus range selection means may comprise a screw hole and a screw ping or a through hole and a pin. In the latter case, the pin can be adapted to be firmly fitted into and removed from the bore by controlling fit tolerance. In the case where the focus of the zoom lens is adjusted by adjusting a position in which a biasing spring for biasing a lens element in either one of axial directions is attached, it is preferred to form the hole as a slot elongated in the axial direction. Further, in the case where the zoom lens comprises a lens holder frame with a focusing lens element mounted therein that is rectilinearly movable within the movable barrel and a focus adjusting cam ring having an end face cam forced against a front end of the lens holder frame which is rotated relatively to the movable barrel so as to be located in the initial position, it is preferred to form a slot elongated in a circumferential direction in the movable barrel when the focus adjusting cam ring has one hole in an external wall.

Furthermore, the zoom lens may further comprise a lens holder barrel mounting the focus lens element that is mounted within the movable barrel through helicoid coupling so as that lens holder barrel moves in an axial direction with respect to the movable barrel during rotation relative to the movable barrel according to leads of the helicoid threads for focusing, besides moving in the axial direction together with the movable barrel during relative rotation between the movable barrel and the cam barrel for zooming. In this zoom lens, the focus range selection means may comprise holding means formed in the movable barrel for holding the selection member and restriction means such as recesses formed in the lens holder barrel for defining moving distances of the lend holder barrel differently for the ranges of focus of the zoom lens system, respectively. In the case where a plurality of focus range selection means are equipped, the focus range selection means are offset in an axial direction and the selection member is adapted to be selectively attached to the movable barrel in different circumferential positions. It is of course that the focus range selection means may be offset in a circumferential direction, and hence the selection member is adapted to be selectively attached to the movable barrel in different axial positions.

According to the zoom lens of the present invention having circumferential zooming cam slots with extension slots continuously extending therefrom, respectively, in the cam barrel, the focus range selection means are exposed to the outside of the zoom lens all at once when the cam barrel is put in an extreme end of the zooming range, namely a telephoto end position or a wide-angle end position, or one by one during rotation of the cam barrel, so that focus adjustment of the zoom lens is easily performed even after the zoom lens has been assembled. In consequence, efficiency of the focus adjustment is enhanced. Furthermore, the zoom lens allows an increases in the degree of freedom of assembling procedure and, in consequence, enhanced assembling efficiency.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which.

DETAILED DESCRIPTION OF THE PREFERRED EMBODIMENTS

Figure 1:
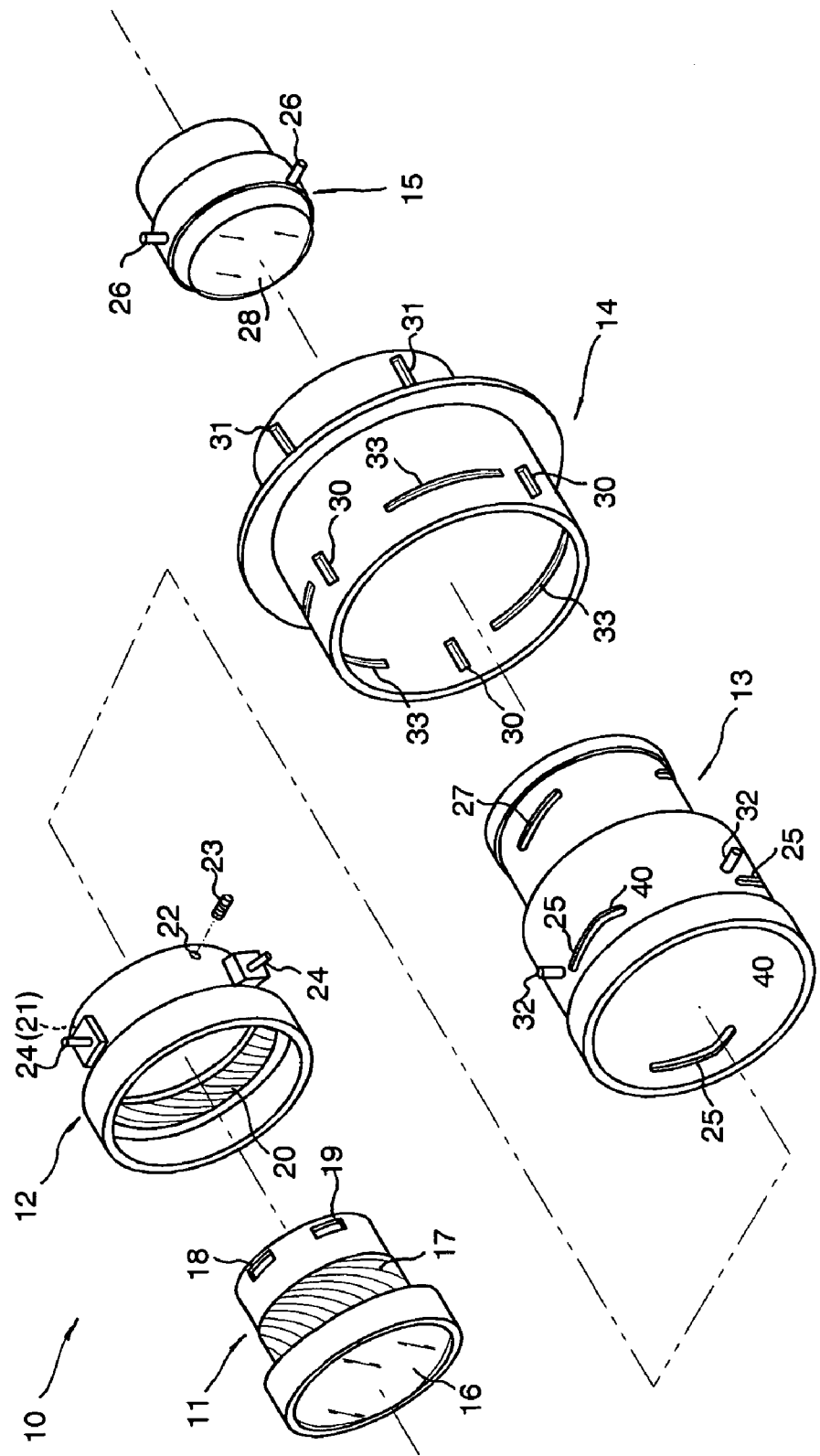
FIG. 1 is an exploded perspective view of a zoom lens barrel according to an embodiment of the present invention.

Referring to the accompanying drawings in detail, and in particular, to FIG. 1 showing a zoom lens 10 according to an embodiment of the present invention, the zoom lens 10 comprises a plurality of cylindrical barrels, namely a front lens holding barrel 11, a movable barrel 12, a cam barrel, a stationary barrel 14, and a rear lens holding barrel 15. The front lens holding barrel 11 has a first group of lenses 16 mounted therein. The front lens holding barrel 11 has a first group of lenses 16 mounted therein, and the rear lens holding barrel 15 has a second group of lenses 28 mounted therein. The movable barrel 12 has internal helicoids threads 20. The front lens holding barrel 11 rotates with respective to the movable barrel 12 during focusing so as thereby to move axially within the movable barrel 12 according to leads of the helicoids threads 17 and 20.

The front lens holding barrel 11 is provided with external helicoid threads 17 and first and second rotational range recesses or through holes 18 and 19 shaped square. The first and second rotational range recesses 18 and 19 are located in positions circumferentially and axially different from each other. The movable barrel 12 is provided with internal helical threads 20 engageable with the helical threads 17 of the front lens holding barrel 11, a plurality of, for example three in this embodiment, cam follower pins 24 extending radially outward and disposed with regular circumferential intervals and first and second screw holes 21 and 22 (first screw hole 21 is hidden behind the cam follower pin 24; see FIGS. 5 and 6). The first and second screw holes 21 and 22 are located in circumferentially different but axially identical positions. As will be described later, each screw hole 21, 22 is located at a specific distance from the cam follower pin 24. The movable barrel 12 is rotationally coupled to the front lens holding barrel 11 through engagement between their helicoids threads 17 and 20. A screw pin 23 serving as range selection means is engaged in either one of the screw holes 22 which is chosen according to a result of focus adjustment The range selection screw pin 23 engaged in the first screw hole 21 is received in the first rotational range recess 18 so as thereby to restrict rotation of the front lens holding barrel 11 with respect to the movable barrel 12 to a first rotational range AA (see FIG. 3) according to a circumferential length of the first rotational range recess 18. Similarly, the range selection screw pin 23 engaged in the second screw hole 22 is received in the second rotational range recess 19 so as thereby to restrain rotation of the front lens holding barrel 11 with respect to the movable barrel 12 to a second rotational range AB (see FIG. 3) according to a circumferential length of the second rotational range recess 19. The rotational range recesses 18 and 19 may be shaped so as to define the rotational ranges of the front lens holding barrel 11 completely different or partly overlapping and essentially have axial widths covering possible axial movement of the front lens holding barrel 11 according to the first rotational range AA or the second rotational range AB.

The cam barrel 13 is provided with a plurality of, for example three in this embodiment, first circumferential cam slots 25 disposed with regular circumferential intervals, a plurality of, for example three in this embodiment, second circumferential cam slots 27 disposed with regular circumferential intervals, and a plurality of, a plurality of, for example three in this embodiment, thrust restraint pins 32 extending radially outward and disposed with regular circumferential intervals. The movable barrel 12 is rotationally coupled to the cam barrel 13 through engagement of the cam follower pins 24 of the movable barrel 12 with the circumferential cam slots, respectively.

The stationary barrel 14 is provided with a plurality of, for example three in this embodiment, first rectilinear guide sots 30, a plurality of, for example three in this embodiment, second rectilinear guide slots 31, and a plurality of, for example three in this embodiment, thrust restraint slots 33 extending circumferentially. The movable barrel 12 and the cam barrel 13 are rotationally or linearly movably coupled to the stationary barrel 13 through engagement of the cam follower pins 24 of the movable barrel 12 with the circumferential cam slots 25 of the cam barrel 13 and the first rectilinear cam slots 30, respectively. However, the cam barrel 13 is prevented from moving axially within and with respect to the stationary barrel 14 by means of engagement of the thrust restraint pins 32 of the cam barrel with the thrust restraint slots 33 of the stationary barrel 14.

The front lens holding barrel 11 is provided with a plurality of, for example three in this embodiment, cam followers 26 extending radially outward and disposed with regular circumferential intervals. The front lens holding barrel 11 is rotationally coupled to the cam barrel 13 through engagement of the cam follower pins 26 with the second circumferential cam slots 27 of the cam barrel 13, and further linearly movably coupled to the stationary barrel 13 through engagement of the cam follower pins 26 passing through the second circumferential cam slots 27 with the rectilinear guide slots 31 of the stationary barrel 14, respectively.

Figure 2:
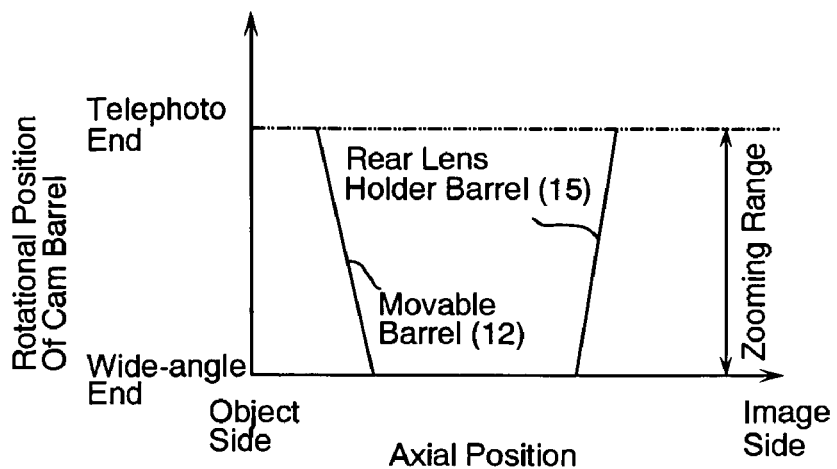
FIG. 2 is a graphical illustration showing an axial position of a movable barrel and a rear lens holding barrel with respect to a rotational position of a cam barrel.

FIG. 2 is a graphical illustration showing an axial position of the movable barrel 12 and the rear lens holding barrel 15 with respect to an angle of rotation of a cam barrel 13. As shown, the cam barrel 13 is rotative to a desired position within a possible zooming range or between opposite extreme ends of zooming, namely a telephoto end position and a wide-angle end position During rotation of the cam barrel 13, the movable barrel 12 is forced in an axial direction due to axial displacement of the cam follower pins 24 in the cam slots 25 according to an angle of rotation of the cam barrel 13. Simultaneously, the rear lens holding barrel 15 is forced in an axial direction due to axial displacement of the cam follower pins 26 in the cam slots 27 according to an angle of rotation of the cam barrel 13.

Figure 3:
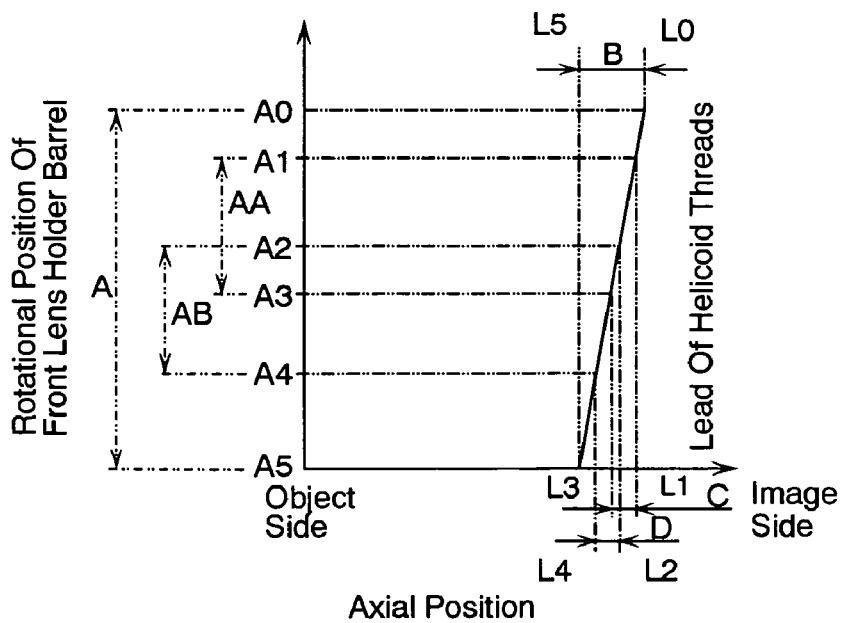
FIG. 3 is a graphical illustration showing the relationship between rotational and axial positions of the front lens holding barrel.

FIG. 3 is a graphical illustration showing the relationship between rotational and axial positions of the front lens holding barrel 11. As shown, the front lens holding barrel 11 has a maximum rotational range A between extreme rotational positions A0 and A5 with respect to the movable barrel 12 and a maximum axial movable range B between extreme movable positions L0 (on the image side) and L5 (on the object side). The first rotational range AA is chosen through engagement of the range selection screw pin 23 with either one of the rotational range recesses 18 and 19, and the second rotational range AB is chosen through engagement of the range selection screw pin 23 with the other of the rotational range recesses 18 and 19. These first and second rotational ranges AA and AB are established so as to partly overlap in this embodiment. When the first rotational range AA is chosen, the front lens holding barrel 11 is allowed to move in axial direction within a first focus range C between axial positions L1 and L3 within the maximum axial movable range B. On the other hand, when the second rotational range AB is chosen, the front lens holding barrel 11 is allowed to move in axial direction within a second focus range D between axial positions L2 and L4 that partly overlap with the first focus range C within the maximum axial movable range B. In FIG. 3, the axial position L1 is an extreme movable position on the image side, and the axial position L4 is an extreme position on the object side.

Figure 4:
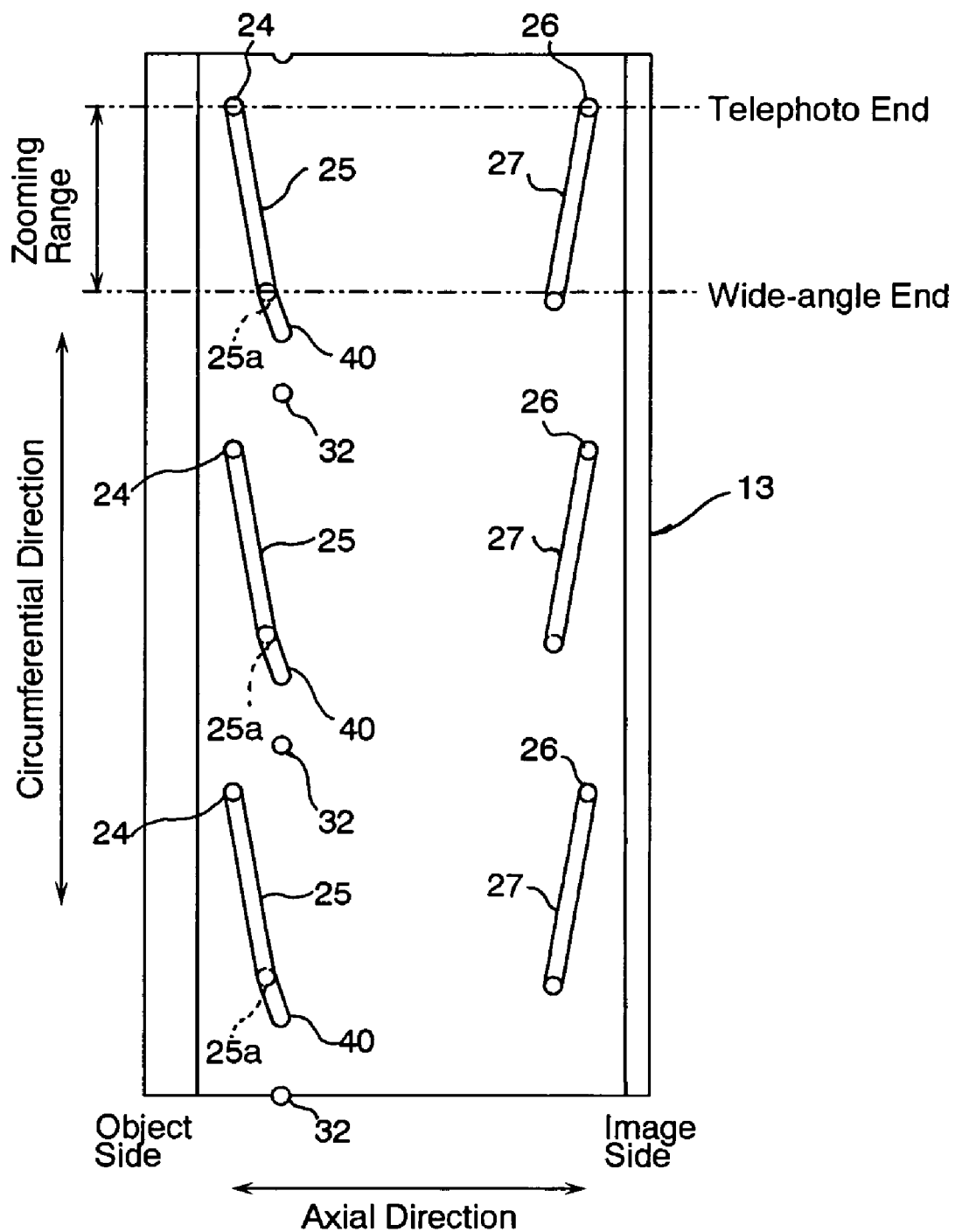
FIG. 4 is an expansion view of the cam barrel in which a cam follower in a telephoto end position and a wide-angle end position.
Figure 5:
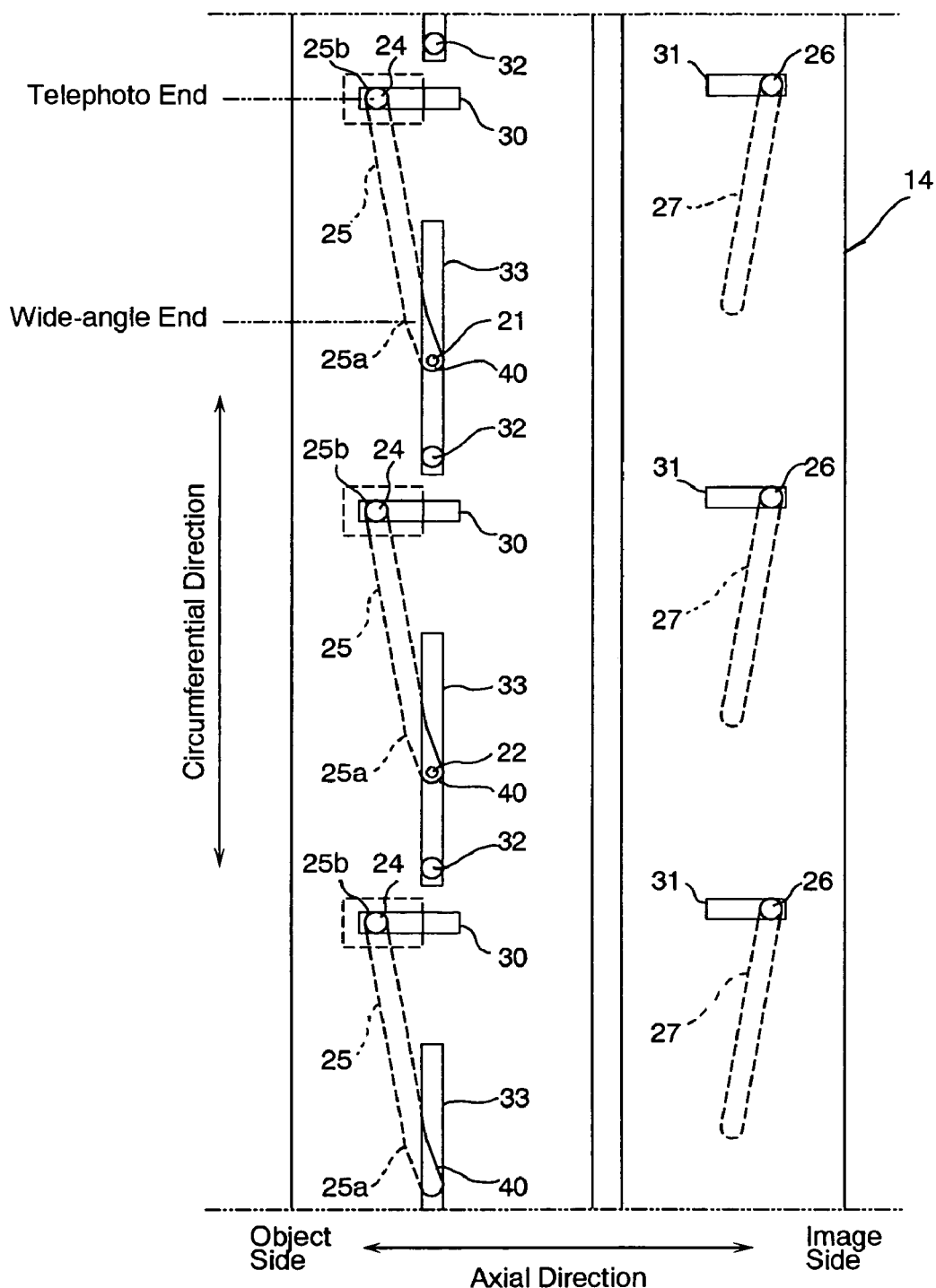
FIG. 5 is an expansion view of a stationary barrel in which cam followers and screw holes are shown in positions when the cam barrel is put in a telephoto end position.

Referring to FIG. 4 showing the cam barrel in detail, each of the first circumferential cam slots 25 has an extension slot 40 continuously extending from one end thereof as an access path. The extension slots 40 are used to perform focus position adjustment after having assembled all constituent barrels to the zoom lens 10. Specifically, the extension slots 40 are formed so as to be accessible through the thrust restraint slots 33 of the stationary barrel 14 when the constituent barrels 11 to 15 have been assembled to the zoom lens 10. Further, as was described previously, the screw hole 21, 22 is located at specific same distances from adjacent cam follower pin 24, respectively, so that the first and second screw holes 21 and 22 are accessible through the extension slots 40 of two adjacent cam slots 25, respectively, when the cam barrel is put in, for example, the telephoto end position as shown in FIG. 5. Therefore, the range selection screw pin 23 can be screwed in or unscrewed from either one of the first and second screw holes 21 and 22 with a screw driver from the outside of the zoom lens 10 until reaching the rotational range recess 18 or 19 so as thereby to choose either one of the first and second rotational ranges AA and AB. In an assembling process, the range selection screw pin 23 is screwed into one screw hole designated in the design specification.

Figure 6:
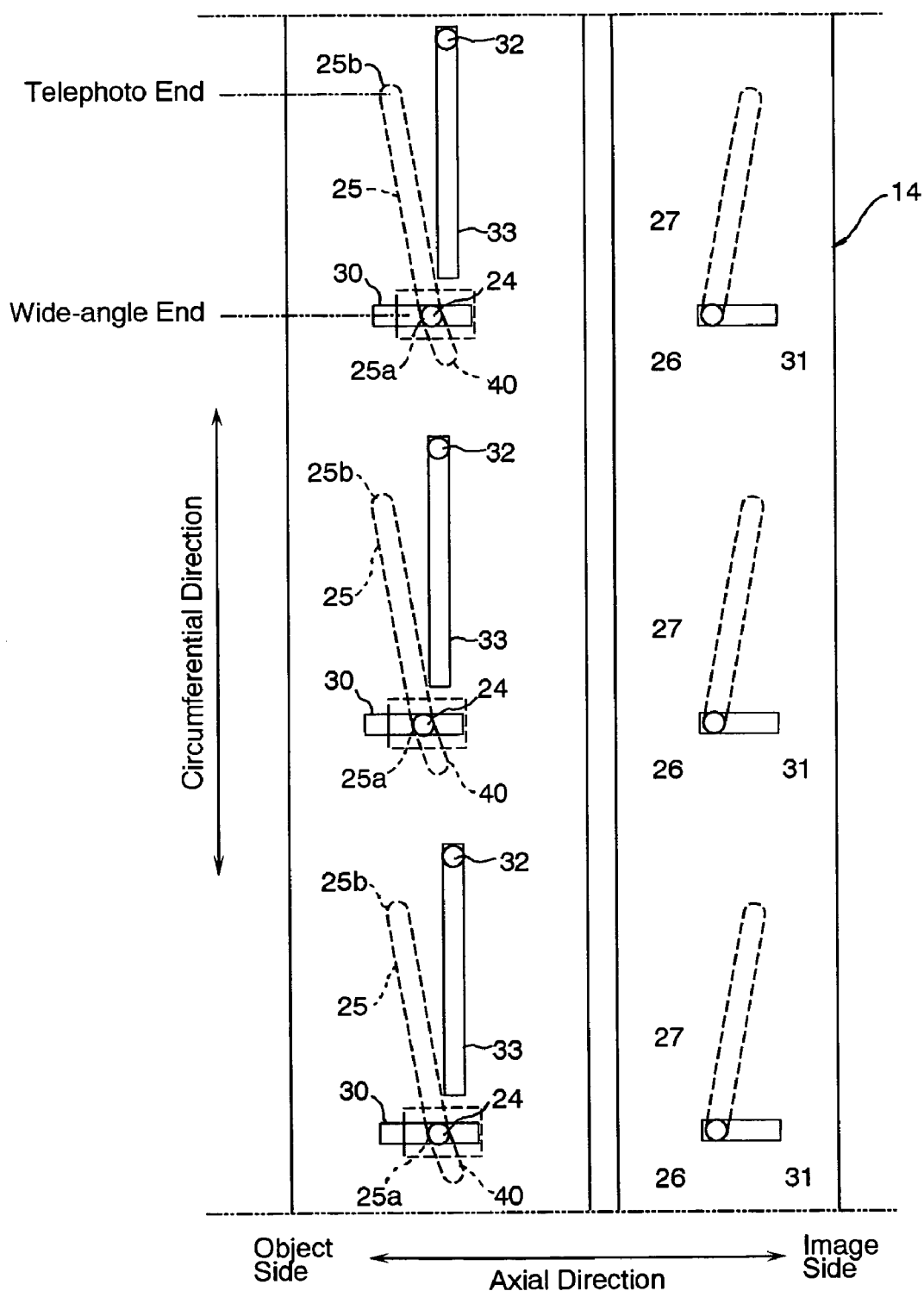
FIG. 6 is an expansion view of the stationary barrel in which cam followers and screw holes are shown in positions when the cam barrel is put in a wide-angle end position.

In this instance, the first and second screw holes 21 and 22 are exteriorly exposed when the cam barrel 13 is put in the telephoto end position as shown in FIG. 5 and, however, hidden inside by the stationary barrel 14 when the cam barrel 13 is put in the wide-angle end position as shown in FIG. 6.

Assembling and focus position adjustment of the zoom lens 10 thus structured is performed as described below. First of all, the zoom lens 10 is assembled by inserting the movable barrel 12 into the cam barrel 13 from the front and then the rear lens holding barrel 15 into the same from the front or vice versa. Subsequently, after inserting the cam barrel 13 into the stationary barrel 14, the thrust restraint pins 32 are fixedly attached to the cam barrel 13 through the thrust restraint slots 33, respectively. In this state, the cam barrel 13 is held in the stationary barrel 14 so as to be rotatable but prevented from axially moving. Then, the cam follower pins 24 are fixedly attached to the movable barrel 12 through the first rectilinear guide slots 30 and the first cam slots 25, respectively, and the cam follower pins 26 are fixedly attached to the rear lens holding barrel 15 through the second rectilinear guide slots 31 and the second circumferential cam slots 27, respectively. In this state, the movable barrel 12 and the rear lens holding barrel 15 are held in the cam barrel 13 so as to be axially movable in opposite directions according to rotation of the cam barrel 13 with respect to the stationary barrel 14. Finally, after screwing the front lens holding barrel 11 into the movable barrel 12 through helicoid thread coupling between the helical threads 17 and 20, the range selection screw pin 23 is screwed in one of the first and second screw holes 21 and 22 until reaching the rotational range recess 18 or 19 as designated in the design specification In this manner, assembling of the zoom lens 10 is completed.

The completed zoom lens 10 is sent to an adjusting station for focus adjustment. Focus adjustment is performed through, for example, the following steps. That is, the front lens holding barrel 11 is rotated with respect to the movable barrel 12 until the range selection screw pin 23 abuts against one of opposite extreme edges of the rotational range recess 18 that is on a close-up side. Then, a distance of an object on which the zoom lens 10 is focused is measured. When the object distance falls within a predetermined extent of object distance, the zoom lens 10 is freed from focus adjustment. If the object distance is out of the predetermined extent of object distance, either one of the first and second screw holes 21 and 22 into which the range selection screw pin 23 should be screwed is chosen according to how far or how close the object is. Because, regarding an infinite distance, focusing accuracy can be warranted only by shifting the front lens holding barrel 11, it is typically suffice to carry out focus adjustment for extremely close ranges. The shift distance can be warranted simply by the circumferential length of the rotational range recess 18 at the design phase.

After having made a choice of either the first screw hole 21 or the second screw hole 22, the cam barrel 13 is rotated with respect to the stationary barrel 14 until reaching the telephoto end position shown in FIG. 5. The telephoto end position is provided at an extreme end 25a of the first circumferential cam slots 25 opposite to the extension slot 40, the cam barrel 13 is allowed to be simply and easily rotated until striking the extreme end of the first circumferential cam slots 25. In the telephoto end position, the first and second screw holes 21 and 22 are positioned so as to be accessible through adjacent two of the thrust restraint slots 33 of the stationary barrel 14 and adjacent two of the extension slot s 40 of adjacent two of the first circumferential cam slots 25 of the cam barrel 13. In consequently, it is easy to screw the range selection screw pin 23 into the screw hole 21 or 22 from the outside of the stationary barrel 14 without removing the movable barrel 12 and then screwing the range selection screw pin 23.

When screwing the range selection screw pin 23 into the first screw hole 21, the front lens holder barrel 11 is rotated with respect to the movable barrel 12 beforehand so as to bring the first rotational range recess 18 in line with the first screw hole 21. In this state, the front lens holder barrel 11 is restricted in rotation within the first rotational range AA so as thereby to move within the first focus range C during focusing as shown in FIG. 3. On the other hand, when screwing the range selection screw pin 23 into the second screw hole 22, the front lens holder barrel 11 is rotated with respect to the movable barrel 12 beforehand so as to bring the second rotational range recess 19 in line with the second screw hole 22. In this state, the front lens holder barrel 11 is restricted in rotation within the second rotational range AB so as thereby to move within the second focus range D during focusing as shown in FIG. 3.

Although, in the zoom lens of the described embodiment, the extension slots 40 extending continuously extending from the wide-angle end of the first circumferential cam slots 25 of the cam barrel 13 are used as access paths to the screw holes 21 and 22 which the range selection screw pin 23 is attached to or removed from, nevertheless, they are available for positional and operational adjustment of adjusting focus adjusting springs and/or their associated parts that are hidden inside by the cam barrel 13 and, in consequence, hardly accessible. Although the access path is provided by the extension slots 40 continuously extending from the first circumferential cam slot 25 of the cam barrel 13 so as to be accessible through the thrust restraint slot 33 of the stationary barrel 14, it may be provided by the thrust restraint slot 33 itself or an extension slot continuously extending from the thrust restraint slot 33. In this manner, according to the zoom lens of the present invention, slots earmarked for specific purposes or extension slots of the specific slots formed in multiple overlapping barrels are used for forming an access path to the screw holes 21 and 22. Further, although the first and second screw holes 21 and 22 are disposed so as to be exteriorly exposed all at once through the extension slots 40 when the cam barrel 13 is put in a specific rotational position, namely the telephoto end position in the described embodiment, it may be possible to exteriorly expose the first and second screw holes 21 and 22 one by one during gradual rotation of the cam barrel 13.

Furthermore, although the zoom lens 10 is exemplified as comprising two lens groups, namely the first and second lens groups 16 and 28, it may comprise three or more lens groups. The screw pin 23 and the screw holes 21 and 22 forming the range selection means may be replaced with a pin and bores. In this case, the pin can be adapted to be firmly fitted into and removed from the bore by controlling fit tolerance.

It is to be understood that although the present invention has been described with regard to a preferred embodiments thereof, various other embodiments and variants may occur to those skilled in the art, which are within the scope and spirit of the invention, and such other embodiments and variants are intended to be covered by the following claims.

What is claimed is:

1. A zoom lens comprising a cam barrel having a plurality of circumferential cam slots for zooming, stationary rectilinear guide means having axial guide slots disposed so that said axial guide slots overlap with said circumferential cam slots, respectively, a movable barrel inserted in said cam barrel so as to be rotatable and linearly movable in an axial direction within said cam barrel, said movable barrel having cam followers in slide engagement with both said circumferential cam slots and said rectilinear guide slots, respectively, so that said movable barrel is linearly moved in said axial direction with relative rotation between said cam barrel and said movable barrel so as thereby to move at least one lens element forming a part of a zoom lens system for zooming, and focus adjusting means for adjusting focus of said zoom lens system, said focus adjusting means comprising:

a plurality of focus range selection means formed on said movable barrel for providing different ranges of focus of said zoom lens system;

a selection member selectively attachable to said focus range selection means so as to enable either one of said different ranges of focus, and an access slot extending continuously from an extreme end of one or more said circumferential cam slot so as to be brought in line with said focus range selection means for access of said selection member to said focus range selection means from the outside of said cam barrel.

2. The zoom lens as defined in claim 1, wherein each said circumferential cam slot has said extension slot so that said focus range selection means are brought in line with said extension slots all at once.

3. The zoom lens as defined in claim 1, wherein at least one of said circumferential cam slots has said extension slot so that said focus range selection means are brought in line with said extension slot one by one during relative rotation between said movable barrel and said cam barrel.

4. The zoom lens as defined in claim 1, and further comprising a lens holder barrel mounting said lens element, said lens holder barrel being mounted within said movable barrel through helicoid coupling so as to move in an axial direction together with said movable barrel during relative rotation between said movable barrel and said cam barrel for zooming and to move in an axial direction with respect to said movable barrel during rotation relative to said movable barrel for focusing, wherein said focus range selection means comprises holding means formed in said movable barrel for holding said selection member and restriction means formed in said lens holder barrel for defining axially moving distances of said lend holder barrel differently for said ranges of focus of said zoom lens system, respectively.

* * * * *